United States Patent

Brychta et al.

[11] Patent Number: 5,007,394
[45] Date of Patent: Apr. 16, 1991

[54] COMBUSTION CHAMBER FOR COMPRESSION IGNITION INTERNAL COMBUSTION ENGINE

[75] Inventors: Jaroslav Brychta; Eduard Lutisan; Vladimir Jirkovsky, all of Prague, Czechoslovakia

[73] Assignee: AVIA koncern, Prague, Czechoslovakia

[21] Appl. No.: 521,600

[22] Filed: May 10, 1990

[30] Foreign Application Priority Data

May 12, 1989 [CS] Czechoslovakia ............... 2858-89

[51] Int. Cl.$^5$ .............................................. F02F 3/00
[52] U.S. Cl. ............................ 123/279; 123/193 P; 123/666
[58] Field of Search ............... 123/279, 276, 193 P, 123/662, 663, 666

[56] References Cited

U.S. PATENT DOCUMENTS

| | | | |
|---|---|---|---|
| 1,759,162 | 5/1930 | Lang | 123/276 |
| 2,466,321 | 5/1949 | MacKenzie | 123/663 |
| 3,112,738 | 12/1963 | Morris | 123/193 P |
| 4,858,566 | 8/1989 | Paul et al. | 123/193 P |
| 4,942,804 | 7/1990 | Matsuura et al. | 123/193 P |

*Primary Examiner*—Andrew M. Dolinar
*Assistant Examiner*—M. Macy
*Attorney, Agent, or Firm*—Klein & Vibber

[57] ABSTRACT

A combustion chamber, designed for compression ignition internal combustion engines, solves the problem of distribution and whirling of fuel mixture in the combustion chamber of the engine and from this the resulting easier ignition of fuel mixture, optimum increase in the combustion pressures with optimum layout of the valve gear and the intake and exhaust channels in a simplified design of the cylinder head enabled by the larger eccentricity of the injection jet. A rotary combustion chamber is formed in the piston head, the bottom of the chamber formed by a rotary peripheral surface and rotary internal surface with a circular barrier. Ratios between the depth of the rotary peripheral surface and the depth of the top of the barrier, the largest diameter of the rotary internal surface and the largest diameter of the rotary peripheral surface, and the depth of both rotary surfaces are defined in specific ranges.

4 Claims, 1 Drawing Sheet

COMBUSTION CHAMBER FOR COMPRESSION IGNITION INTERNAL COMBUSTION ENGINE

FIELD OF THE INVENTION

This invention relates to a combustion chamber formed in the piston head of compression ignition internal combustion engines with a multiport jet direct fuel injection.

BACKGROUND OF THE INVENTION

Combustion chambers in the piston head for compression ignition engines with direct fuel injection are known. They are formed by a rotary side wall passing into a shaped bottom of the combustion chamber. The combustion chamber axis is identical to the cylinder axis or lies in its close vicinity. The injection jet is placed in the middle or near the middle of the cylinder head between intake and exhaust channels. Such centrally located combustion chambers, whose injection jet is also centrally located, are capable of creating an optimum filling whirl in the combustion chamber, optimum fuel mixture and its distribution in the combustion chamber, i.e. a rich mixture at the combustion chamber walls and a leaner mixture in the middle of the combustion chamber. The process of combustion is thus enhanced and there is an increase in combustion pressures ensuing from this. Fuel consumption and exhaust emissions are improved as well.

Rotary combustion chambers for compression ignition engines with direct fuel injection by multiport jet are also known. DE 30 18 577 discloses a combustion chamber misaligned in the piston bottom and equipped in the middle part of the combustion chamber bottom with a rotary lug which together with a further shaping of the combustion chamber serves for optimizing fuel mixture whirl. With respect to the reduction of volume of the central part of the combustion chamber where the leanest fuel mixture is after the injection, a faster combustion of the fuel mixture occurs, which unfavorably influences the speed of increase in combustion pressures.

All known combustion chambers that are capable of providing optimum whirling of fuel filling, the suitable distribution of fuel mixture, and the optimum increase in the combustion pressure are arranged co-axially with the cylinder axis or misaligned by a maximum of 0.2 times the combustion chamber diameter. If the misalignment of the combustion chamber is larger, during the air filling compression the whirl splits and more whirls are created and this unfavorably influences the composition and distribution of the fuel mixture in the combustion chamber which affects ignition, combustion pressures, fuel consumption and harmful emissions.

Yet, a larger misalignment of the combustion chamber is desirable with respect to the requirement of a larger misalignment of the injection jet which enables an uncompromising location of the intake and exhaust channel in the engine cylinder head and valve gear.

SUMMARY OF THE INVENTION

It is an object of the present invention to provide a combustion chamber for direct fuel injection by a multiport injection jet which even with its misalignment larger than 0.2 times the combustion chamber diameter, will maintain an undisturbed filling whirl in the combustion chamber, will provide an optimum fuel mixture and fuel mixture distribution, with an easier ignition of fuel, without increasing the combustion pressures or noise, and with the capability of having a larger misalignment in the location of the injection jet and the ensuing simplified construction of the head together with the capability for optimum arrangement for the intake and exhaust channels and the valve gear.

The above mentioned disadvantages of compression ignition engines with multiport jet direct fuel injection and the combustion chamber located in the piston head and bordered by a rotary side wall and shaped bottom, are lowered to a minimum by the combustion chamber according to the present invention. In the present invention, the combustion chamber bottom in the piston head is formed by a peripheral rotary surface separated from the internal rotary surface by a barrier whose plane is circular with the following ratios: the ratio between the barrier top's depth measured from the plane surface of piston head and the peripheral rotary surface deepest depth is in 0.4 to 0.7 range, the ratio between the internal rotary surface largest diameter and the peripheral rotary surface largest diameter is in 0.25 to 0.45 range, and the ratio between the internal rotary surface deepest depth and the peripheral rotary surface deepest depth is in 0.85 to 1.15 range.

It is advantageous that the volume bordered by the internal rotary surface and the plane in which the barrier top circle passes is 2–10% of the entire volume of the combustion chamber in the piston head.

From the viewpoint of technology of manufacturing, it is advantageous that the peripheral rotary surface of the combustion chamber bottom is shaped as a semiannuloid plane and created by the rotation of a hemispherical arc around the combustion chamber axis, and that the internal rotary surface in the combustion chamber bottom is hemispherical and that the following be adhered to: the radius of the arc forming the peripheral rotary surface is 0.4 to 0.55 times the distance of its center from the combustion chamber axis; the peripheral rotary surface in the combustion chamber bottom is smoothly followed by the rotary side wall surface whose creating straight line and the combustion chamber axis defines an angle $\leq 20°$ whose vertex is above the piston.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
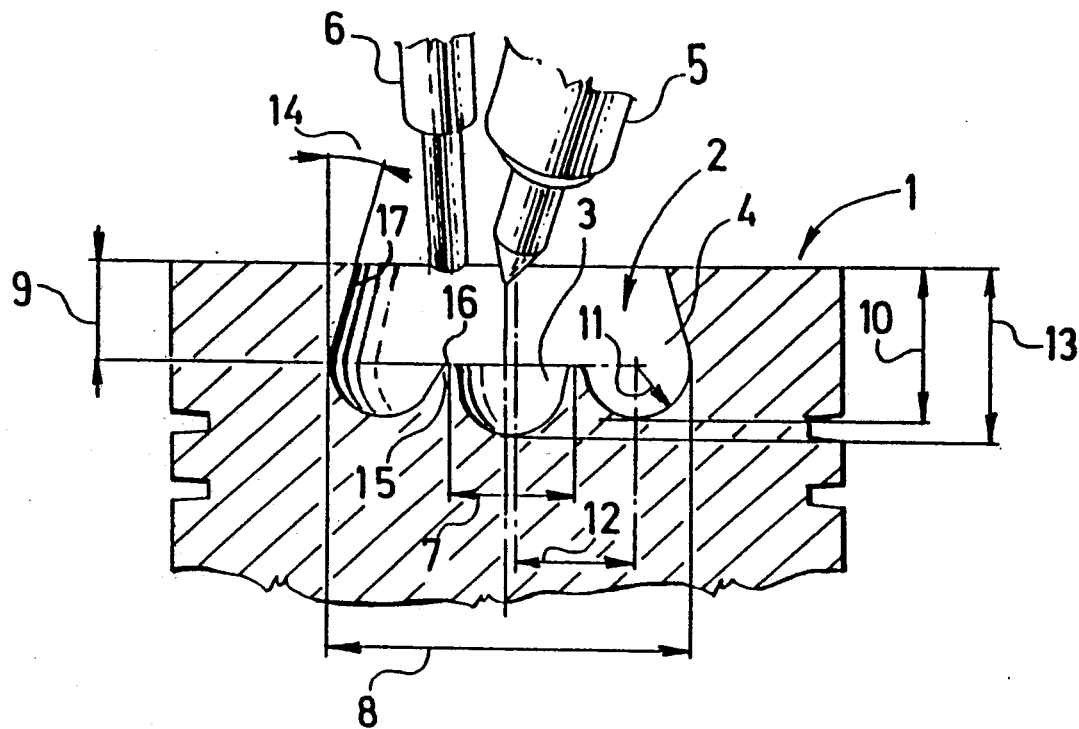
FIG. 1 is a cross section of a piston head and
FIG. 2 is a top view of a piston head.

Referring now to FIG. 1, a combustion chamber 2 is formed in a piston head 1. The combustion chamber 2 is bordered by rotary side wall 17 and has a shaped bottom which is formed by a peripheral semi-toroid rotary surface. A barrier 15 is closed into a circle and encircles an internal hemispherical rotary surface 3.

The "bottom" of the combustion chamber 2 is defined as the surface located under the plane in which the top circle of the barrier 15 lies. The rotary side wall 17 in the combustion chamber 2 forms the surface above this plane. The rotary side wall 17 is advantageously shaped as the lateral area of a truncated cone opening towards the bottom of the combustion chamber 2 and whose flange and cylinder axis form an angle 14 in the range 0° to 20°. The peripheral rotary surface 4 of the bottom is geometrically formed by rotation of a radius 11 circular arc from a distance 12 around the axis of the combustion chamber 2.

The central part of the bottom of the combustion chamber 2 is a hemispherical internal rotary surface 3 geometrically formed by the rotation of a circular arc of diameter 7 around the combustion chamber axis. The peripheral rotary surface 4 and the internal rotary surface 3 in the bottom of the combustion chamber 2 form between them the annular barrier 15 of circular plane.

The volume of the internal rotary surface 3 of the combustion chamber bottom is between 2 to 10% of the entire volume of the combustion chamber. The distance between the top 16 of the barrier 15 and the upper planar surface of the piston 1 (piston head) is called the depth 9 of the barrier top. The distance of the lowest point of the peripheral rotary surface 4 in the bottom of the combustion chamber 2 from the upper planar surface of the piston is called the deepest depth 10 of the peripheral rotary surface 4 and the distance of the lowest point of the internal rotary surfaced 3 from the upper planar surface of the piston 1 is called the deepest depth 13 of the internal rotary surface.

According to the preferred embodiment of the invention, the ratio between the depth 9 of the top 16 of the barrier 15 and the deepest depth 10 of the peripheral rotary surface is in the 0.4 to 0.7 range; the ratio between the largest diameter 7 of the internal rotary surface 3 and the largest diameter 8 of the peripheral rotary surface 4 is in the 0.25 to 0.45 range; and the ratio between the deepest depth 13 of the internal rotary surface 3 and the deepest depth 10 of the peripheral rotary surface 4 is in the 0.85 to 1.15 range.

Figure 2:
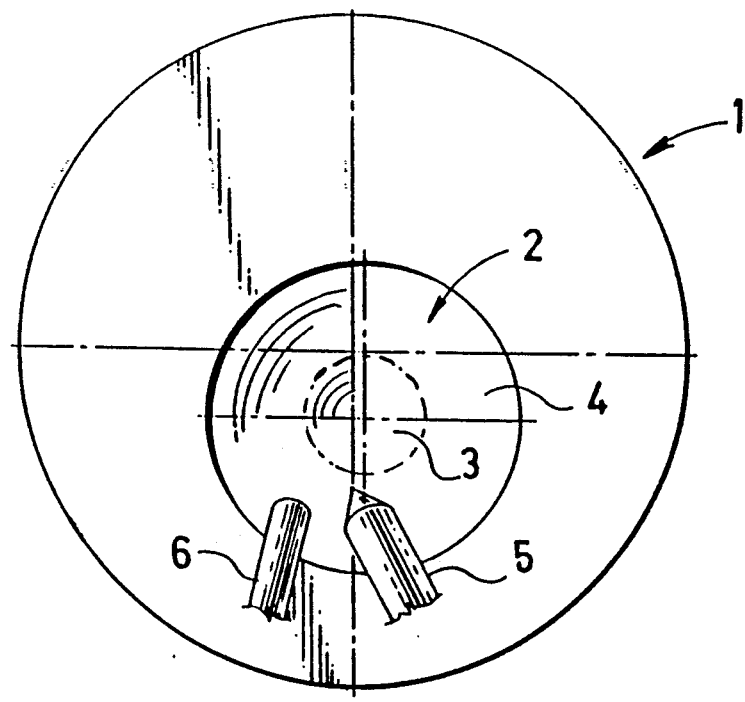

FIGS. 1 and 2 schematically show also the position of an ignition plug 6 and multiport injection jet 5 which are located with a large eccentricity from the axis of the piston 1 in the cylinder head (not shown) and enter the peripheral part of the combustion chamber 2.

MANNER OF OPERATION

After intake of air into the cylinder, the compression stroke follows during which the air in the combustion chamber 2 is set into a rotary whirl predominantly shaped by the barrier 15 and also by the rotary side wall surface 17 and the bottom as well.

After the injection of fuel by the multiport injection jet 5 into the whirling air, due to the shaped whirl and the division of the bottom of the combustion chamber into the peripheral and internal parts, there is created a homogeneous rich fuel mixture at the periphery of the combustion chamber 2 and a lean mixture in the middle of the combustion chamber.

After the ignition of the fuel mixture at the periphery of the combustion chamber 2, the substantially leaner fuel mixture from the central part for the combustion chamber 2, predominantly from the volume of the internal rotary surface 3 of the combustion chamber 2, is brought into the combustion process. This controls the process of combustion, so that it is possible to obtain minimum specific fuel consumption, low increases in the combustion pressures and low harmful emissions in the exhaust gases.

The ignition plug 6 can be located advantageously in the peripheral part of the combustion chamber 2 where optimum conditions for the ignition of the fuel mixture exist.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A combustion chamber for a compression ignition internal combustion engine with multiport jet direct fuel injection, said chamber comprising
   a hollow cavity formed in a piston head wherein said cavity is defined by a rotary side wall surface and a shaped bottom;
   said shaped bottom of the combustion chamber in the piston head having a peripheral rotary surface and an internal rotary surface;
   said peripheral rotary surface being separated from said internal rotary surface by a barrier of circular plan;
   said barrier having a top, said piston head having a planar surface, said rotary surfaces each having diameters, distances from said planar surfaces being referred to as depths, the following ratios being adhered to:
   the ratio between the depth of the top of the barrier and the maximum depth of the peripheral rotary surface being in the range from 0.4 to 0.7;
   the ratio between the maximum diameter of the internal rotary surface and the maximum diameter of the peripheral rotary surface being in the range from 0.25 to 0.45; and
   the ratio between the maximum depth of the internal rotary surface and the maximum depth of the peripheral rotary surface being in the range 0.85 to 1.15.

2. The combustion chamber as claimed in claim 1, wherein the volume defined by the internal rotary surface and the plane in which the top of the barrier lies forms 2 to 10% of the entire volume of the combustion chamber in the piston head.

3. The combustion chamber as claimed in claim 1, wherein the peripheral rotary surface of the bottom of the combustion chamber is shaped as a semi-toroid formed by the rotation of a hemispherical arc around the combustion chamber axis and the internal rotary surface of the bottom of the combustion chamber is hemispherical.

4. The combustion chamber as claimed in claim 1, wherein the peripheral rotary surface of the bottom of the combustion chamber is smoothly followed by the rotary side wall surface of the combustion chamber and wherein a straight line along said side wall and the combustion chamber axis form an angle of 0° to 20° with a vertex above the piston.

* * * * *